(12) United States Patent
Ng et al.

(10) Patent No.: US 10,346,037 B2
(45) Date of Patent: Jul. 9, 2019

(54) DISABLING A TOUCH SENSING DEVICE OF A HANDHELD ELECTRONIC DEVICE

(71) Applicant: HEWLETT-PACKARD DEVELOPMENT COMPANY, L.P., Houston, TX (US)

(72) Inventors: Kay Seah Ng, Singapore (SG); Kah Hoe Ng, Singapore (SG); Tzye Perng Poh, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 14/770,810

(22) PCT Filed: Mar. 22, 2013

(86) PCT No.: PCT/US2013/033421
§ 371 (c)(1),
(2) Date: Aug. 26, 2015

(87) PCT Pub. No.: WO2014/149051
PCT Pub. Date: Sep. 25, 2014

(65) Prior Publication Data
US 2016/0018986 A1     Jan. 21, 2016

(51) Int. Cl.
*G06F 3/041* (2006.01)
*G06F 3/0488* (2013.01)

(52) U.S. Cl.
CPC ........ *G06F 3/04886* (2013.01); *G06F 3/0416* (2013.01); *G06F 3/0488* (2013.01); *G06F 2203/04106* (2013.01)

(58) Field of Classification Search
CPC .......... G06F 3/02; G06F 3/041; G06F 3/0412; G06F 3/0416; G06F 3/0426; G06F 3/044; G06F 3/045; G06F 3/04886
(Continued)

(56) References Cited

U.S. PATENT DOCUMENTS 8,259,083 B2   9/2012 Kim
2006/0197750 A1   9/2006 Kerr
(Continued)

FOREIGN PATENT DOCUMENTS

CN   101021766   8/2007
CN   101078963 A   11/2007
(Continued)

OTHER PUBLICATIONS

Bakke, K.; "Sony Files NGP Backside Touchpad Patent", Jan. 28.
Campbell, M. "Apple's virtual keyboard tech could lead to backside input for tablets", Sep. 6, 2012.

*Primary Examiner* — Alexander Eisen
*Assistant Examiner* — Nelson Lam
(74) *Attorney, Agent, or Firm* — HPI Patent Department

(57) ABSTRACT

A handheld electronic device is disclosed. The handheld electronic device comprises a first touch sensing device located in a first region of the handheld electronic device and a second touch sensing device located in a second different region on the handheld electronic device. The handheld electronic device may further include a disabling module to automatically disable the second touch sensing device if a keyboard input is requested and a virtual keyboard is displayed on the first touch sensing device.

20 Claims, 3 Drawing Sheets

(58) Field of Classification Search
USPC .................................. 345/1.1–1.3, 168–179
See application file for complete search history.

(56) References Cited

U.S. PATENT DOCUMENTS

| | | | | |
|---|---|---|---|---|
| 2007/0188450 | A1* | 8/2007 | Hernandez | G06F 1/1626 345/158 |
| 2008/0143679 | A1* | 6/2008 | Harmon | G06F 3/0213 345/173 |
| 2009/0160681 | A1* | 6/2009 | Chen | G06F 3/162 341/23 |
| 2010/0323762 | A1* | 12/2010 | Sindhu | G06F 1/1613 455/566 |
| 2011/0161809 | A1* | 6/2011 | Gilmour | G06F 1/1626 715/702 |
| 2011/0187647 | A1 | 8/2011 | Woloszynski et al. | |
| 2013/0050094 | A1* | 2/2013 | Rhee | G06F 3/0418 345/168 |
| 2013/0088431 | A1* | 4/2013 | Ballagas | G06F 1/1626 345/168 |
| 2014/0132514 | A1* | 5/2014 | Kuzara | G06F 1/1647 345/158 |
| 2015/0130738 | A1* | 5/2015 | Park | G06F 3/1446 345/173 |
| 2015/0370523 | A1* | 12/2015 | Maebara | G06F 3/1423 345/173 |
| 2018/0121012 | A1* | 5/2018 | Asrani | G06F 3/0416 |

FOREIGN PATENT DOCUMENTS

| | | |
|---|---|---|
| CN | 202523004 U | 11/2012 |
| EP | 2282256 A1 | 2/2011 |
| KR | 20-2013-0000786 U | 2/2013 |

\* cited by examiner

DISABLING A TOUCH SENSING DEVICE OF A HANDHELD ELECTRONIC DEVICE

BACKGROUND

Numerous types of handheld electronic devices are known. Examples of such handheld electronic devices include, for instance, personal data assistants (PDAs), tablet computers, smart telephones and the like. Such handheld electronic devices are generally intended to be portable. Some devices such as a smart phone can be held by a single hand while others like a tablet computer are normally held by two hands. These electronic devices typically include a display and an input device such as a button or a touch screen. The display is typically configured to present visual information such as text and graphics and the input device is typically configured to enable a user to interact with the electronic device.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

In the following, examples of the present disclosure are described in detail with reference to the drawings.

Figure 1:
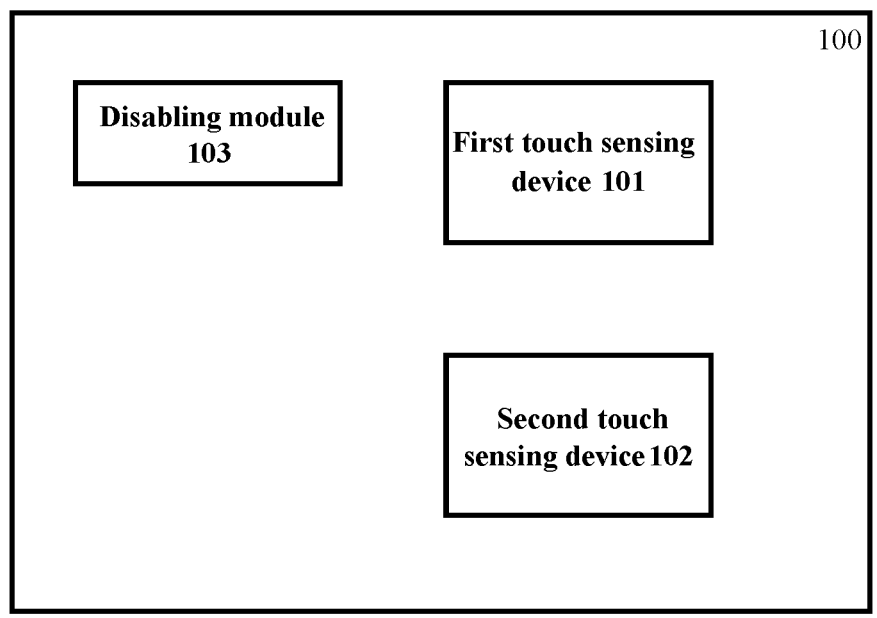
FIG. 1 is a block diagram of a handheld electronic device according to an example of the present disclosure.

With reference to FIG. 1 now, FIG. 1 is a block diagram of a handheld electronic device according to an example of the present disclosure. The handheld electronic device 100 shown in FIG. 1 includes at least a first touch sensing device 101 and a second touch sensing device 102, both of which are configured to provide inputs to the handheld electronic device 100. The handheld electronic device 100 can further include a disabling module 103, whose function will be described in detail below.

The first/touch sensing device 101 can be located in a first region, of the handheld electronic device 100 and the second touch sensing device 102 can be located in a second region different from the first touch sensing device 101 on the handheld electronic device 100. Although not shown, the handheld electronic device 100 also includes a display that forms a viewing region of the handheld electronic device 100. In an example, the first touch sensing device 101 can be located over the viewing region of the handheld electronic device 100 (i.e. on front side of the electronic device) and the second touch sensing device 102 can be located opposite to the viewing region (i.e. on the backside of the electronic device) and configured to cover substantially an entire surface of backside of the handheld electronic device 101. However, it will be appreciated that the first and second touch sensing devices 101 and 102 can be positioned on any side of the handheld electronic device 100 including for example the front, back, top, bottom, right side and left side. Furthermore, they can be configured to take up any amount of spaces, for example covering a portion of the surface.

The touch sensing devices 101 and 102 are configured to detect the presence of an object such as a finger as well as the location and pressure exerted on their surfaces by the finger. By way of example, both the first touch sensing device 101 and the second touch sensing device 102 can be selected from touch panels, touch screens or touch sensitive housings. Furthermore, they may be based on sensing technologies including but not limited to capacitive sensing, resistive sensing, surface acoustic wave sensing, and/or the like. In addition, the touch sensing devices may be based on single point sensing or multipoint sensing. Single point sensing is capable of only distinguishing a single touch, while multipoint sensing is capable of distinguishing multiple touches that occur at the same time.

A user can use either the first touch sensing device 101 or the second touch sensing device 102 to manipulate the electronic device 100. For example, the first touch sensing device 101 can be a touch screen and the user can scroll through a document or a collection of photos or resize a particular image by touching the touch screen with his thumb or fingers. However, content on the display screen might be blocked by the user's own finger(s) to complete a touch action. In such circumstances, the user can use the second touch sensing device 102 located for example on the backside of the handheld electronic device 100 to perform touch actions. This can enhance the human interface experience.

To further facilitate the user's operation, when the second touch sensing device 102 is used to provide inputs, a cursor of any type can appear on the display screen so that the user would know where his finger is pointing at.

In some oases, the user may use the handheld electronic device 100 to edit a document or might want to log onto his Email box by using a browser application residing on the device 100 and some networking component such as a Wireless Fidelity (WiFi) controller (not shown in FIG. 1). In such circumstances, the user would need to use a keyboard to type words or input a website address. Due to considerations of portability and form factors, many handheld electronic devices do not have an integrated physical keyboard. Instead, a virtual keyboard would appear on the display screen for the user to select characters or numbers. In such cases, according to an example of the present disclosure, the disabling module 103 in the handheld electronic device 100 may automatically disable the second touch sensing device 102 if a keyboard input is reunited from the second touch sensing device 102, so that the user can use the first touch sensing device 101 for keyboard input. When using the first touch sensing device 101 for keyboard input the user may hold the handheld electronic device 100 in a way that would create an input using the second touch sensing device and therefore when the virtual keyboard is used for input the second touch sensing device is automatically disabled.

Figure 2:
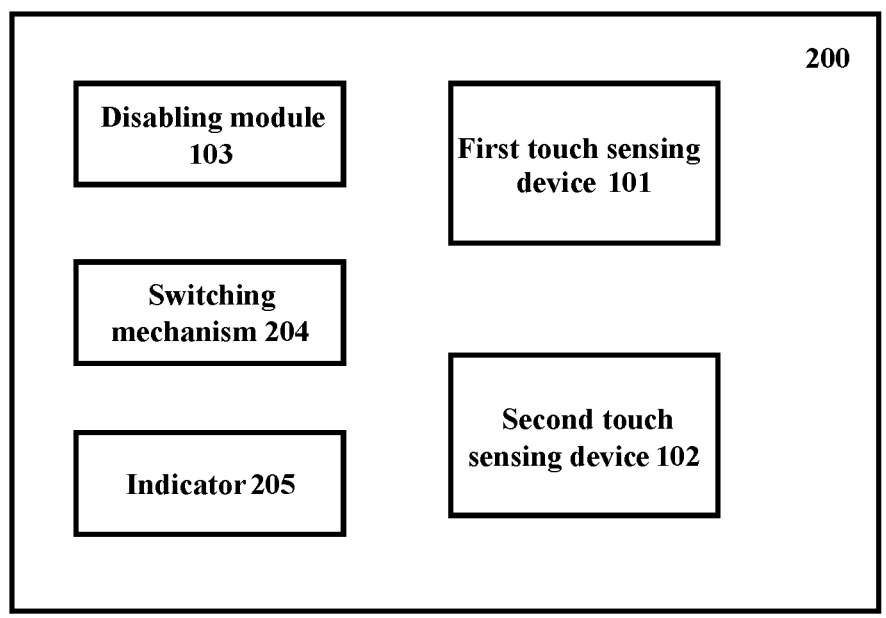
FIG. 2 is a block diagram of a handheld electronic device according to another example of the present disclosure.

With reference to FIG. 2 now, FIG. 2 is a block diagram of a handheld electronic device according to another example of the present disclosure. Besides the first touch sensing device 101, the second touch sensing device 102 and the disabling module 103 shown in FIG. 1, the handheld electronic device 200 in FIG. 2 further includes a switching mechanism 204 and an indicator 205.

The switching mechanism 204 can be configured to switch between the first touch sensing device 101 and the second touch sensing device 102. In an example, the switching mechanism 204 can be a hardware switch on the handheld electronic device 200, including but not limited to a push button located on a side of the handheld electronic device 200. For instance, every time the switch is activated. (e.g. the button is pushed), the first touch sensing device 101 can be switched to the second touch sensing device 102 and vice versa. In another example, the switching mechanism 204 can be implemented in software. For instance, a graphical, user interlace can be shown on the display screen, with options to prompt the user to select which touch sensing device to use.

The indicator 205 in FIG. 2 can be configured to inform the user of disabling or enabling of the second touch sensing device 102 or the first touch sensing device 101. By way of example, the indicator 205 can be light such as an LED light, which may be illuminated upon enabling the second touch sensing device 102 and can be shut off upon disabling the second touch sensing device 102, so that the user can be notified which touch sensing device is in use now. In another example, a graphical user interface notification can be presented on the display screen to notify the user of the same.

Figure 3:
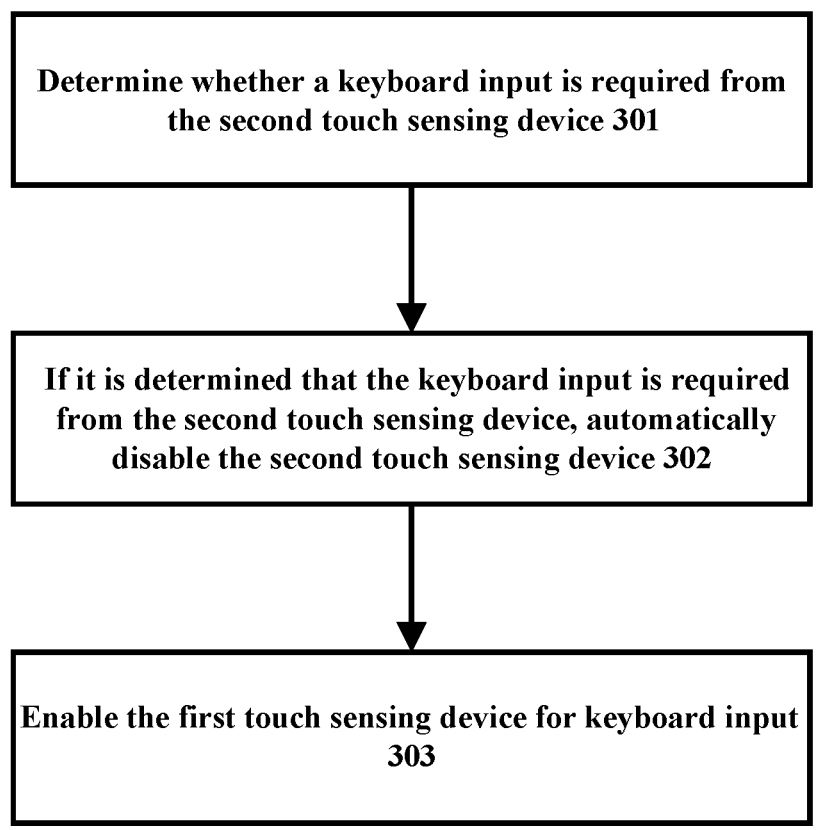
FIG. 3 is a process flow diagram for a method of operating a handheld electronic device according to an example of the present disclosure.

With reference to FIG. 3 now, FIG. 3 is a process flow diagram for a method of operating a handheld electronic device according to an example of the present disclosure. As described above, the handheld electronic device can comprise a first touch sensing device located over a viewing region of the handheld electronic device and a second differently positioned touch sensing device. The handheld electronic device can be started up by enabling the first touch sensing device on the front side of electronic device and a user may switch to the second touch sensing device by software setting or activating a hardware switch. The method 300 starts at block 301, where it is determined whether a keyboard input is required item the second touch sensing device. At block 302, if it is determined that the keyboard input is required from the second touch sensing device, the second touch sensing device is automatically disabled. Then, at block 303, the first touch sensing device can be enabled for the user to input with the keyboard.

Figure 4:
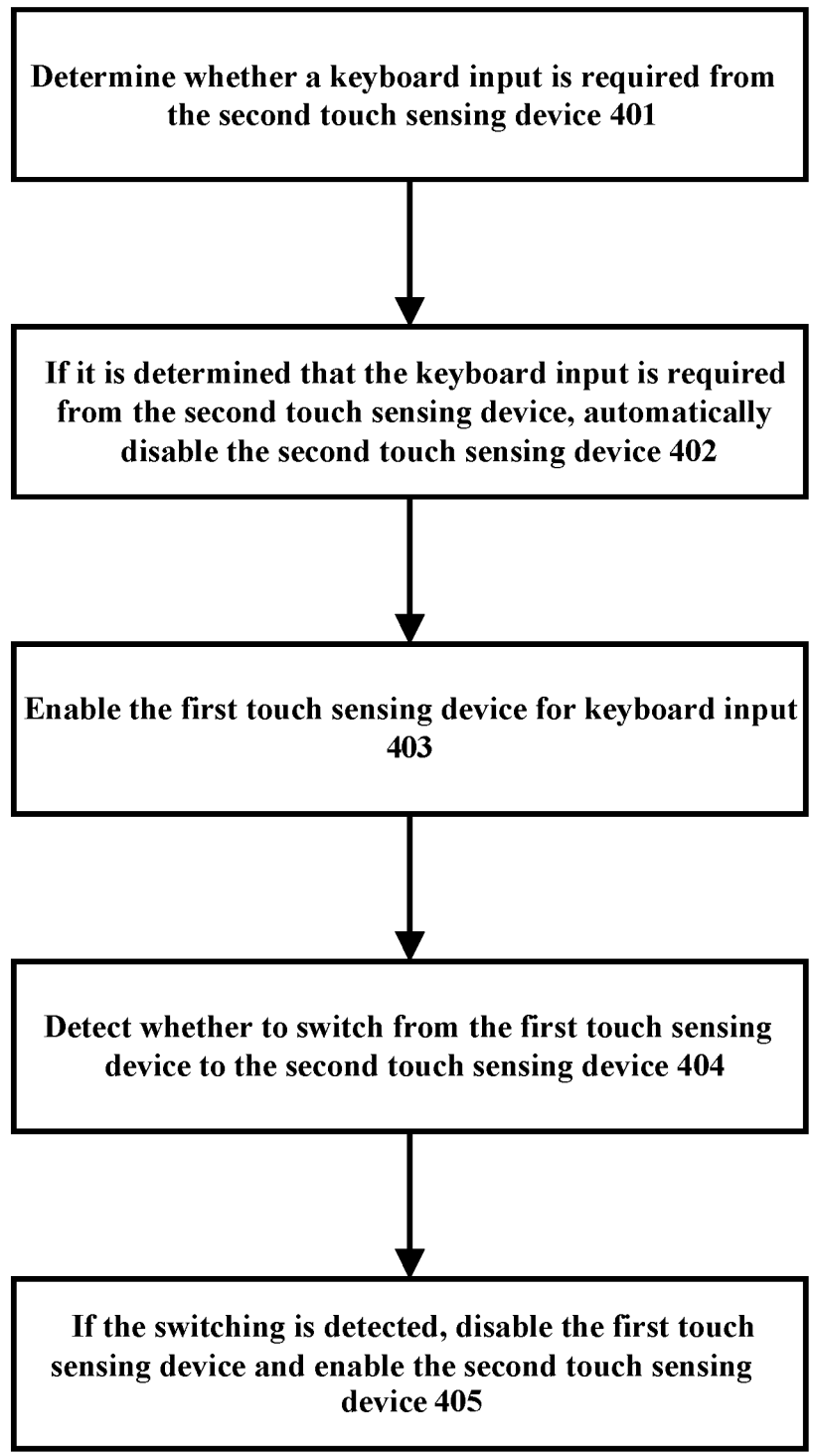
FIG. 4 is a process flow diagram for another method of operating a handheld electronic device according to an example of the present disclosure

With reference to FIG. 4 now, FIG. 4 is a process flow diagram for another method 400 of operating a handheld electronic device according to an example of the present disclosure. As shown, blocks 401-403 are the same as blocks 301-303 in FIG. 3 and will not be described in detail herein. At block 404, it is detected whether to switch from the first touch sensing device to the second touch sensing device or not. If the switching is detected, at block 405, the first touch sensing device is disabled and the second touch sensing device is enabled. Although not shown, the method 400 can further include indicating enabling or disabling of the first or second touch sensing device to the user.

From the above depiction of the implementation mode, the above examples can be implemented by hardware, software or firmware or a combination thereof. For example the various methods, processes, modules and functional units described herein may be implemented by a processor (the term processor is to be interpreted broadly to include a CPU, processing unit, ASIC, logic unit, or programmable gate array etc.) The processes, methods and functional units may all be performed by a single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

The invention claimed is:

1. A handheld electronic device, comprising:
   a first touch sensing device located in a first region of the handheld electronic device;
   a second touch sensing device located in a second different region on the handheld electronic device;
   a processor; and
   instructions executable on the processor to:
      automatically disable the second touch sensing device in response to a request for a virtual keyboard input at the handheld electronic device that is without a physical keyboard, the request for the virtual keyboard input responsive to a user interacting with an application of the handheld electronic device, and
      display a virtual keyboard on the first touch sensing device in response to the request for the virtual keyboard input responsive to the user interacting with the application of the handheld electronic device, while the second touch sensing device is disabled.

2. The handheld electronic device of claim 1, wherein the first touch sensing device is located over a viewing region on a front side of the handheld electronic device, and the second touch sensing device is located to cover a surface on a back side of the handheld electronic device, the back side opposite to the front side.

3. The handheld electronic device of claim 1, further comprising:
   a switch to switch between the first touch sensing device and the second touch sensing device.

4. The handheld electronic device of claim 3, wherein the switch comprises a hardware switch on the handheld electronic device.

5. The handheld electronic device of claim 3, wherein the switch comprises a graphical user interface control element.

6. The handheld electronic device of claim 1, further comprising:
   an indicator to inform a user of the disabling of the second touch sensing device.

7. The handheld electronic device of claim 6, wherein the indicator comprises a light or a graphical user interface notification.

8. The handheld electronic device of claim 1, wherein the first touch sensing device comprises a touch screen, and the second touch sensing device comprises a touch surface that is responsive to user touch.

9. The handheld electronic device of claim 8, wherein the touch surface of the second touch sensing device comprises a capacitive sensing touch surface.

10. The handheld electronic device of claim 8, wherein the touch surface of the second touch sensing device comprises a resistive sensing touch surface.

11. A method for operating a handheld electronic device which comprises a first touch sensing device located over a viewing region on a front side of the handheld electronic device, and a second touch sensing device on a back side of the handheld electronic device, the back side opposite to the front side, the method comprising:
  determining whether a virtual keyboard input is requested at the handheld electronic device that is without a physical keyboard, the request for the virtual keyboard input responsive to a user interacting with an application of the handheld electronic device;
  in response to determining that the virtual keyboard input is requested:
    at the handheld electronic device that is without a physical keyboard, automatically disabling the second touch sensing device; and
    displaying a virtual keyboard on the first touch sensing device for the virtual keyboard input, while the second touch sensing device is disabled.

12. The method of claim 11, further comprising:
  determining whether to switch from the first touch sensing device to the second touch sensing device; and
  in response to determining to switch from the first touch sensing device to the second touch sensing device, disabling the first touch sensing device and enabling the second touch sensing device.

13. The method of claim 12, further comprising:
  indicating, using an indicator, the disabling of the first touch sensing device to a user.

14. The method of claim 12, wherein the switching is responsive to activating a hardware switch or a software setting.

15. The method of claim 11, wherein the first touch sensing device comprises a touch screen, and the second touch sensing device comprises a touch surface that is responsive to user touch.

16. The method of claim 15, wherein the touch surface of the second touch sensing device comprises a capacitive sensing touch surface.

17. The method of claim 15, wherein the touch surface of the second touch sensing device comprises a resistive sensing touch surface.

18. A handheld electronic device, comprising:
  a touch screen located over a viewing region of the handheld electronic device;
  a touch sensing device opposite the touch screen, the touch sensing device comprising a touch surface responsive to a user gesture on the touch surface;
  a processor; and
  a non-transitory storage medium storing instructions executable on the processor to:
    determine whether a virtual keyboard input is requested at the handheld electronic device that is without a physical keyboard, the request for the virtual keyboard input responsive to a user interacting with an application of the handheld electronic device;
    in response to determining that the virtual keyboard input is requested responsive to the user interacting with the application of the handheld electronic device:
      automatically disable the touch sensing device; and
      display a virtual keyboard in the touch screen for the virtual keyboard input, while the touch sensing device is disabled.

19. The handheld electronic device of claim 18, wherein the touch surface of the touch sensing device comprises a capacitive sensing touch surface.

20. The handheld electronic device of claim 18, wherein the touch screen is on a front side of the handheld electronic device, and the touch sensing device is on a back side of the handheld electronic device, the front side opposite to the back side.

* * * * *